United States Patent
Jiang et al.

(10) Patent No.: US 12,353,346 B2
(45) Date of Patent: Jul. 8, 2025

(54) NEAR-MEMORY COMPUTING MODULE AND METHOD, NEAR-MEMORY COMPUTING NETWORK AND CONSTRUCTION METHOD

(71) Applicant: XI'AN UNIIC SEMICONDUCTORS CO., LTD., Xi'an (CN)

(72) Inventors: Xiping Jiang, Xi'an (CN); Xiaofeng Zhou, Xi'an (CN); Fengguo Zuo, Xi'an (CN)

(73) Assignee: XI'AN UNIIC SEMICONDUCTORS CO., LTD., Xi'an (CN)

( * ) Notice: Subject to any disclaimer, the term of this patent is extended or adjusted under 35 U.S.C. 154(b) by 269 days.

(21) Appl. No.: 18/016,945

(22) PCT Filed: Jan. 26, 2021

(86) PCT No.: PCT/CN2021/073752
§ 371 (c)(1),
(2) Date: Jan. 19, 2023

(87) PCT Pub. No.: WO2022/021822
PCT Pub. Date: Feb. 3, 2022

(65) Prior Publication Data
US 2023/0350827 A1    Nov. 2, 2023

(30) Foreign Application Priority Data
Jul. 30, 2020  (CN) .......................... 202010753117.2

(51) Int. Cl.
*G06F 13/40* (2006.01)
*G06F 13/16* (2006.01)

(52) U.S. Cl.
CPC ...... *G06F 13/4022* (2013.01); *G06F 13/1668* (2013.01)

(58) Field of Classification Search
CPC ............. G06F 13/4022; G06F 13/1668; G06F 15/7839; G06F 15/7807; G06F 2213/0038; G06F 15/7821
See application file for complete search history.

(56) References Cited

U.S. PATENT DOCUMENTS

| 9,443,561 B1* | 9/2016 | Roberts ............... G06F 13/4068 |
| 10,678,738 B2* | 6/2020 | Dai ..................... G06F 15/7807 |

(Continued)

FOREIGN PATENT DOCUMENTS

| CN | 109240605 A | 1/2019 |
| CN | 110770901 A | 2/2020 |

(Continued)

OTHER PUBLICATIONS

Gabriel H. Loh, "3D-Stacked Memory Architectures for Multi-core Processors," 2008 International Symposium on Computer Architecture, Jul. 15, 2022, pp. 453-464.

(Continued)

*Primary Examiner* — Idriss N Alrobaye
*Assistant Examiner* — Richard B Franklin
(74) *Attorney, Agent, or Firm* — Clements Bernard Walker; Christopher L. Bernard; Devin Cummins

(57) ABSTRACT

Provided are a near-memory computing module and method, a near-memory computing network, and a construction method. The near-memory computing module employs a three-dimensional design, computing submodules and a memory submodule are provided in different layers, the layers are connected by means of bonding, and the total data bit width connected is a positive integer multiple of the data bit width of a single computing unit (201). Multiple memory units (203) are provided in the memory submodule, thus allowing a large memory capacity to be implemented in a single memory submodule. Computing units of the comput- (Continued)

ing submodule exchange data with each other via an exchange interface of a router (202); moreover, among the computing submodules data is accessed via a routing interface. The near-memory computing network utilizes the near-memory computing module and satisfies computing requirements of different scales.

18 Claims, 5 Drawing Sheets

(56) References Cited

U.S. PATENT DOCUMENTS

| | | |
|---|---|---|
| 2018/0081583 A1 | 3/2018 | Breternitz et al. |
| 2018/0284992 A1 | 10/2018 | Haller et al. |
| 2020/0026513 A1 | 1/2020 | Akin et al. |

FOREIGN PATENT DOCUMENTS

| | | |
|---|---|---|
| CN | 111009518 A | 4/2020 |
| WO | 2017020193 A1 | 2/2018 |
| WO | 2018058430 A1 | 4/2018 |

OTHER PUBLICATIONS

Apr. 25, 2021, International Search Report for International Application No. PCT/CN2021/073\52.

\* cited by examiner

NEAR-MEMORY COMPUTING MODULE AND METHOD, NEAR-MEMORY COMPUTING NETWORK AND CONSTRUCTION METHOD

CROSS-REFERENCE TO RELATED APPLICATIONS

This application is a National Stage Entry Application of PCT Patent Application No. PCT/CN2021/073752, having an International filing date of Jan. 26, 2021, which claims priority to CN202010753117.2 filed on Jul. 30, 2020, the contents of which are incorporated by reference in their entirety.

TECHNICAL FIELD

The present application relates to the field of memory. In particular, the present application relates to a near-memory computing module and method, a near-memory computing network and a construction method.

BACKGROUND ART

In the prior art, processor manufacturers and memory manufacturers are separated from each other, which causes the development of memory technology and the development of processor technology to be out of sync. Processor performance improves rapidly, while memory performance improves relatively slowly. The unbalanced developments of processor performance and memory performance have caused the memory access speed to severely lag behind the processor's computing speed. The memory bottleneck makes it difficult for high-performance processors to play well. This poses a great constraint on the ever-increasing high-performance computing. This phenomenon in which memory performance severely limits processor performance is known as the "Memory Wall".

With the continuous and rapid growth of computing capacity of central processing unit (CPU) and application computing scale, the problem of "Memory Wall" has become more and more prominent.

In order to solve the problem of "Memory Wall", the concept of "near-memory computing" or "making memory as close to computation as possible" emerged.

Traditional computing units and memory units are separate, i.e. they are not in the same chip. Therefore, during the traditional computation, a computing unit needs to retrieve data from a memory unit, and then write the data back to the memory unit after processing is completed. The "in-memory computing" is to combine a memory unit and a computing unit, and shorten the data transmission path by making the memory unit as close as possible to the computing unit, thereby reducing the data access latency. Meanwhile, "in-memory computing" manages to increase access bandwidth, thereby effectively improving computing performance.

An "in-memory computing" structure known in the prior art is shown in FIG. 1. In this "in-memory computing" structure, the memory unit is Resistive Random Access Memory (RRAM), and the computing unit is Neural-Network Process Unit (NPU). Since RRAM and NPU use an integrated structure, NPU has low access latency. Nonetheless, for RRAM, the process technology is not yet mature, and the structure design has no expansibility, so it is difficult for RRAM to satisfy higher performance computing demands.

In the prior art, there is also a 3D stacking technology using Through Silicon Via (TSV) technology to implement an "in-memory computing" structure. The 3D stacking technology is to stack multiple wafers together and interconnect different wafers by using TSV technology. This is a three-dimensional multi-layer stacking technology that enables communication of multiple wafers in a vertical direction by TSV. Nonetheless, in the 3D stacking technology, there are many technical difficulties. For example, the filling technology for deep holes in TSV is a technical difficulty, because the filling effect of the deep holes in TSV is directly related to the reliability and yield of the 3D stacking technology, which is crucial for integration and practicality of the 3D stacking technology. For another example, TSV technology needs to maintain good integrity during the thinning process of a substrate so as to avoid crack propagation.

Therefore, there is an urgent need to solve the above-mentioned technical problems in the prior art.

SUMMARY OF THE INVENTION

The present application proposes a near-memory solution, which relates to a near-memory computing module and method, a near-memory computing network and a construction method. The near-memory computing module of the present application employs a three-dimensional design. The computing submodule and the memory submodule are arranged in different layers, which are preferably connected to each other by means of bonding connection. The total data bit width of the connection is a positive integer multiple of the data bit width of a single computing unit. In this way, the latency and bandwidth problems of storage are solved. The memory submodule has a plurality of memory units therein, which can realize a relatively large memory capacity in a single memory submodule. Data exchange between computing units of computing submodules is performed via a switching interface of a router, and data access between computing submodules is performed via a routing interface, thereby further improving the computing performance. The near-memory computing network utilizes the near-memory computing module and thus can meet computing demands of different scales.

According to a first aspect of the present application, there is provided a near-memory computing module, comprising:
  a computing submodule, which comprises a plurality of computing units;
  at least one memory submodule, which is arranged on at least one side of the computing submodule, wherein each memory submodule comprises a plurality of memory units, and each memory submodule is connected to the computing submodule;
  wherein the computing submodule and the at least one memory submodule are located in the same chip.

As a result, the near-memory computing module comprising a plurality of memory submodules can realize large-scale computing in the same chip, and low latency can be achieved when the computing units access memory units, thereby improving computing performance.

According to a preferred embodiment of the near-memory computing module of the present application, the computing submodule further comprises a routing unit:
  wherein the routing unit is connected to each computing unit, the routing unit is connected to each memory unit of each memory submodule, and the routing unit is connected to a routing unit of at least one further near-memory computing module;

wherein the routing unit is configured to perform access of a first computing unit of the near-memory computing module to a second computing unit of the near-memory computing module, or access to a first memory unit of the near-memory computing module, or access to a third computing unit or a second memory unit of at least one further near-memory computing module.

According to a preferred embodiment of the near-memory computing module of the present application, the routing unit comprises:
  a plurality of switching interfaces, which connect the routing unit to each computing unit;
  a routing interface, which connects the routing unit to a routing unit of at least one further near-memory computing module; and
  a memory control interface, which connects the routing unit to each memory unit in each memory submodule.

According to a preferred embodiment of the near-memory computing module of the present application, the routing unit further comprises:
  a crossbar switch unit;
  a switching routing computing unit, wherein the switching routing computing unit is connected to the plurality of switching interfaces, the routing interface, and the crossbar switch unit, wherein the switching routing computing unit stores at least routing information about the near-memory computing module and the plurality of computing units, and wherein the switching routing computing unit parses a received data access request and controls switching of the crossbar switch unit based on parsed data access request;
  a memory control unit, wherein the memory control unit is connected to the crossbar switch unit and the memory control interface, wherein the memory control unit stores at least routing information about the plurality of memory units, and wherein the memory control unit, in response to the switching of the crossbar switch unit to the memory control unit, performs secondary parse of the parsed data access request received from the crossbar switch unit to determine a destination memory unit, and accesses the destination memory unit via the memory control interface.

According to a preferred embodiment of the near-memory computing module of the present application, each computing unit accesses at least one memory unit directly via a routing unit. That is, the routing unit parses a data access request issued by the computing unit, acquires access data directly from the at least one memory unit, and forwards the access data to the computing unit that issued the data access request, wherein the data access request includes at least an address of the at least one memory unit.

According to a preferred embodiment of the near-memory computing module of the present application, each computing unit accesses at least one further memory unit indirectly via a routing unit. That is, the routing unit parses the data access request issued by the computing unit, forwards the parsed data access request to a further computing unit, acquires access data from at least one further memory unit indirectly via the further computing unit, and forwards the access data to the computing unit that issued the data access request, wherein the data access request includes at least an address of the at least one further memory unit, wherein the further computing unit can access the at least one further memory unit directly via the routing unit.

Thus, by means of the routing unit, the overall distribution of the access requests of the computing unit to the memory unit is realized and the memory control function is realized, which can achieve further low latency when the computing unit accesses the memory unit.

According to a preferred embodiment of the near-memory computing module of the present application, the routing unit is connected to each memory unit of each memory submodule by means of bonding connection.

Therefore, the memory submodule and the computing submodule can be connected by mature bonding connection methods to achieve the required electrical performance.

According to a preferred embodiment of the near-memory computing module of the present application, total data bit width of connection between the routing unit and each memory unit of each memory submodule is n multiple of data bit width of a single computing unit, where n is a positive integer.

Therefore, by setting the relationship between the data bit width of the connection between the memory unit and the routing unit and the data bit width of a single computing unit, a higher data bandwidth can be achieved.

According to a preferred embodiment of the near-memory computing module of the present application, in the computing submodule, the routing unit is located at the center, and the plurality of computing units are distributed around the routing unit.

According to a preferred embodiment of the near-memory computing module of the present application, the computing submodule further comprises at least two routing units, each of which is connected to at least one computing unit, and each of which is connected to at least one memory unit of each memory submodule;
  wherein the at least two routing units are connected to each other to form an overall routing unit, wherein the overall routing unit is connected to each computing unit, and is connected to each memory unit of each memory submodule, and is connected to at least one further routing unit of at least one further near-memory computing module;
  wherein the overall routing unit is configured to perform an access of a first computing unit of the near-memory computing module to a second computing unit of the near-memory computing module, or access to a first memory unit of the near-memory computing module, or access to a third computing unit or a second memory unit of at least one further near-memory computing module.

According to a preferred embodiment of the near-memory computing module of the present application, each of the at least two routing units comprises:
  a plurality of switching interfaces, which connects the routing unit to at least one computing unit;
  a routing interface, which connects the routing unit to at least one further routing unit of the near-memory computing module, and/or which connects the routing unit to at least one further routing unit of at least one further near-memory computing module;
  a memory control interface, which connects the routing unit to at least one memory unit.

According to a preferred embodiment of the near-memory computing module of the present application, the at least two routing units are connected to each other via a routing interface.

According to a preferred embodiment of the near-memory computing module of the present application, each of the at least two routing units further comprises:
  a crossbar switch unit;
  a switching routing computing unit, wherein the switching routing computing unit is connected to the plurality of switching interfaces, the routing interface, and the crossbar switch unit, wherein the switching routing computing unit stores at least routing information about the near-memory computing module and the plurality of computing units, and wherein the switching routing computing unit parses a received data access request and controls switching of the crossbar switch unit based on parsed data access request;

a memory control unit, wherein the memory control unit is connected to the crossbar switch unit and the memory control interface, wherein the memory control unit stores at least routing information about the plurality of memory units, and wherein the memory control unit, in response to switching of the crossbar switch unit to the memory control unit, performs secondary parsing of the parsed data access request received from the crossbar switch unit to determine the memory unit to be accessed, and accesses the memory unit to be accessed via the memory control interface.

According to a preferred embodiment of the near-memory computing module of the present application, each computing unit accesses at least one memory unit directly via the overall routing unit. That is, the overall routing unit parses the data access request issued by the computing unit, acquires the access data directly from the at least one memory unit, and forwards the access data to the computing unit that issued the data access request, wherein the data access request includes at least an address of the at least one memory unit.

According to a preferred embodiment of the near-memory computing module of the present application, each computing unit accesses at least one further memory unit indirectly via the overall routing unit. That is, the overall routing unit parses the data access request issued by the computing unit, forwards the parsed data access request to a further computing unit, and acquires access data indirectly from at least one further memory unit via the further computing unit, and forwards the access data to the computing unit that issued the data access request, wherein the data access request includes at least an address of the at least one further memory unit, wherein the further computing unit can access the at least one further memory unit directly via the overall routing unit.

According to a preferred embodiment of the near-memory computing module of the present application, the overall routing unit is connected to each memory unit of each memory submodule by means of bonding connection.

According to a preferred embodiment of the near-memory computing module of the present application, total data bit width between each memory unit and the overall routing unit is n multiple of data bit width of a single computing unit, where n is a positive integer.

According to a preferred embodiment of the near-memory computing module of the present application, in the computing submodule, the at least two routing units are located at the center, and the plurality of computing units are distributed around the at least two routing units.

According to a preferred embodiment of the near-memory computing module of the present application, in the computing submodule, the plurality of computing units are located at the center, and the at least two routing units are distributed around the plurality of computing units.

According to a preferred embodiment of the near-memory computing module of the present application, the memory unit includes a dynamic random access memory, and the computing unit includes a central processing unit.

Since the technology of dynamic random access memory is relatively mature, such memory is preferably used in the present application.

According to a preferred embodiment of the near-memory computing module of the present application, the number of the memory units in the memory submodule is determined at least according to total data bit width of the plurality of computing units in the computing submodule and data bit width of a single memory unit.

Since the number of memory units can be selected according to demands, the design is more flexible.

According to a preferred embodiment of the near-memory computing module of the present application, the storage capacity of the memory unit is customizable.

Since the storage capacity of the memory unit is customizable, the flexibility of design is improved.

According to a second aspect of the present application, there is provided a near-memory computing method, which is used for the near-memory computing module mentioned above (in the near-memory computing module, there is one routing unit in one computing submodule), the near-memory computing method comprising the following steps carried out by a routing unit:

receiving a data access request, wherein the data access request is issued by a first computing unit and includes at least an address of a destination memory unit; and, parsing the data access request, acquiring access data from the destination memory unit, and forwarding the access data to the first computing unit.

In this technical solution, if the destination memory unit and the first computing unit are located in the same near-memory computing module, the "routing unit" refers to the routing unit in the near-memory computing module; and, if the destination memory unit and the first computing unit are not located in the same near-memory computing module, the "routing unit" refers to all routing units required for communication between the first computing unit and the destination memory unit.

According to a preferred embodiment of the near-memory computing method of the present application, the near-memory computing method further comprises the following steps carried out by the routing unit connected to the first computing unit:

after the routing unit parses the data access request and before the routing unit acquires access data from the destination memory unit, judging whether the first computing unit can access the destination memory unit directly via the routing unit connected to the first computing unit;

under the condition that the first computing unit can access the destination memory unit directly via the routing unit connected to the first computing unit, acquiring access data directly from the destination memory unit and forwarding the access data to the first computing unit; and under the condition that the first computing unit cannot access the destination memory unit directly via the routing unit connected to the first computing unit, forwarding the parsed data access request to a second computing unit, and acquiring access data from the destination memory unit via the second computing unit and forwarding the access data to the first computing unit.

According to a preferred embodiment of the near-memory computing method of the present application, the near-memory computing method further comprises the following steps carried out by the routing unit connected to the first computing unit:

under the condition that the first computing unit cannot access the destination memory unit directly via the routing unit connected to the first computing unit and before the routing unit connected to the first computing unit forwards the parsed data access request to a second computing unit, judging whether the destination memory unit and the first computing unit are located in the same near-memory computing module;

under the condition that the destination memory unit and the first computing unit are located in the same near-memory computing module, forwarding the parsed data access request directly to a second computing unit, acquiring access data from the destination memory unit via the second computing unit and forwarding the access data to the first computing unit, wherein the second computing unit can access the destination memory unit directly via the routing unit connected to the first computing unit;

under the condition that the destination memory unit and the first computing unit are not located in the same near-memory computing module, forwarding the parsed data access request to a routing unit of at least one further near-memory computing module connected to the routing unit connected to the first computing unit and forwarding to a second computing unit connected to the routing unit of the at least one further near-memory computing module, and acquiring access data from the destination memory unit via the second computing unit and forwarding the access data to the first computing unit, wherein the second computing unit can access the destination memory unit directly via the routing unit of the at least one further near-memory computing module.

According to a third aspect of the present application, there is provided a near-memory computing method, which is used for the above-mentioned near-memory computing module (in the near-memory computing module, there is one routing unit in one computing submodule), the near-memory computing method comprising the following steps carried out by a routing unit:

receiving a data access request, wherein the data access request is issued by a first computing unit and includes at least an address of a destination computing unit; and, parsing the data access request, acquiring access data from the destination computing unit, and forwarding the access data to the first computing unit.

In this technical solution, if the destination computing unit and the first computing unit are located in the same near-memory computing module, the "routing unit" refers to the routing unit in the near-memory computing module; and, if the destination computing unit and the first computing unit are not located in the same near-memory computing module, the "routing unit" refers to all routing units required for communication between the first computing unit and the destination computing unit.

According to a preferred embodiment of the near-memory computing method of the present application, the near-memory computing method further comprises the following steps carried out by the routing unit connected to the first computing unit:

after the routing unit parses the data access request and before the routing unit acquires access data from the destination computing unit, judging whether the destination computing unit and the first computing unit are located in the same near-memory computing module;

under the condition that the destination computing unit and the first computing unit are located in the same near-memory computing module, acquiring access data directly from the destination computing unit and forwarding the access data to the first computing unit;

under the condition that the destination computing unit and the first computing unit are not located in the same near-memory computing module, forwarding the parsed data access request to a routing unit of at least one further near-memory computing module connected to the routing unit, and acquiring access data from the destination computing unit via the routing unit of the at least one further near-memory computing module and forwarding the access data to the first computing unit.

According to a fourth aspect of the present application, there is provided a near-memory computing method, which is used for the above-mentioned near-memory computing module (in the near-memory computing module, there are at least two routing units in one computing submodule), the near-memory computing method comprising the following steps carried out by an overall routing unit:

receiving a data access request, wherein the data access request is issued by a first computing unit and includes at least an address of a destination memory unit; and, parsing the data access request, acquiring access data from the destination memory unit, and forwarding the access data to the first computing unit.

In this technical solution, if the destination memory unit and the first computing unit are located in the same near-memory computing module, the "overall routing unit" refers to the overall routing unit in the near-memory computing module; and, if the destination memory unit and the first computing unit are not located in the same near-memory computing module, the "overall routing unit" refers to all overall routing units required for communication between the first computing unit and the destination memory unit.

According to a preferred embodiment of the near-memory computing method of the present application, the near-memory computing method further comprises the following steps carried out by the overall routing unit connected to the first computing unit:

after the overall routing unit parses the data access request and before the overall routing unit acquires access data from the destination memory unit, judging whether the first computing unit can access the destination memory unit directly via the overall routing unit connected to the first computing unit;

under the condition that the first computing unit can access the destination memory unit directly via the overall routing unit connected to the first computing unit, acquiring access data directly from the destination memory unit and forwarding the access data to the first computing unit; and under the condition that the first computing unit cannot access the destination memory unit directly via the overall routing unit connected to the first computing unit, forwarding the parsed data access request to a second computing unit, and acquiring access data from the destination memory unit via the second computing unit and forwarding the access data to the first computing unit.

According to a preferred embodiment of the near-memory computing method of the present application, the near-memory computing method further comprises the following steps carried out by the overall routing unit connected to the first computing unit:

under the condition that the first computing unit cannot access the destination memory unit directly via the overall routing unit connected to the first computing unit and before the overall routing unit connected to the first computing unit forwards the parsed data access request to a second computing unit, judging whether the destination memory unit and the first computing unit are located in the same near-memory computing module;

under the condition that the destination memory unit and the first computing unit are located in the same near-memory computing module, forwarding the parsed data access request directly to a second computing unit, acquiring access data from the destination memory unit via the second computing unit and forwarding the access data to the first computing unit, wherein the second computing unit can access the destination memory unit directly via the overall routing unit connected to the first computing unit;

under the condition that the destination memory unit and the first computing unit are not located in the same near-memory computing module, forwarding the parsed data access request to an overall routing unit of at least one further near-memory computing module connected to the overall routing unit connected to the first computing unit and forwarding to a second computing unit connected to the overall routing unit of the at least one further near-memory computing module, and acquiring access data from the destination memory unit via the second computing unit and forwarding the access data to the first computing unit, wherein the second computing unit can access the destination memory unit directly via the overall routing unit of the at least one further near-memory computing module.

According to a fifth aspect of the present application, there is provided a near-memory computing method, which is used for the above-mentioned near-memory computing module (in the near-memory computing module, there are at least two routing units in one computing submodule), the near-memory computing method comprising the following steps carried out by an overall routing unit:

receiving a data access request, wherein the data access request is issued by a first computing unit and includes at least an address of a destination computing unit; and, parsing the data access request, acquiring access data from the destination computing unit, and forwarding the access data to the first computing unit.

In this technical solution, if the destination computing unit and the first computing unit are located in the same near-memory computing module, the "overall routing unit" refers to the overall routing unit in the near-memory computing module; and, if the destination computing unit and the first computing unit are not located in the same near-memory computing module, the "overall routing unit" refers to all overall routing units required for communication between the first computing unit and the destination computing unit.

According to a preferred embodiment of the near-memory computing method of the present application, the near-memory computing method further comprises the following steps carried out by the overall routing unit connected to the first computing unit:

after the overall routing unit parses the data access request and before the overall routing unit acquires access data from the destination computing unit, judging whether the destination computing unit and the first computing unit are located in the same near-memory computing module;

under the condition that the destination computing unit and the first computing unit are located in the same near-memory computing module, acquiring access data directly from the destination computing unit and forwarding the access data to the first computing unit;

under the condition that the destination computing unit and the first computing unit are not located in the same near-memory computing module, forwarding the parsed data access request to an overall routing unit of at least one further near-memory computing module connected to the overall routing unit, and acquiring access data from the destination computing unit via the overall routing unit of the at least one further near-memory computing module and forwarding the access data to the first computing unit.

According to a sixth aspect of the present application, there is provided a near-memory computing network, comprising:

a plurality of near-memory computing modules, which are a plurality of near-memory computing modules mentioned above, and are connected to each other via the routing units thereof.

According to a preferred embodiment of the near-memory computing network of the present application, the plurality of near-memory computing modules are connected into bus, star, ring, tree, mesh and hybrid topologies.

According to a preferred embodiment of the near-memory computing network of the present application, the plurality of near-memory computing modules are connected to each other via routing units by metal wires.

According to a seventh aspect of the present application, there is provided a construction method of a near-memory computing module, comprising:

arranging at least one memory submodule on at least one side of the computing submodule, wherein each memory submodule comprises a plurality of memory units, and the computing submodule comprises a plurality of computing units;

connecting each memory submodule to the computing submodule;

wherein the computing submodule and the at least one memory submodule are arranged in the same chip.

According to a preferred embodiment of the construction method of the present application, the computing submodule further comprises a routing unit, wherein the construction method further comprises:

connecting the routing unit to each computing unit; connecting the routing unit to each memory unit of each memory submodule; connecting the routing unit to a routing unit of at least one further near-memory computing module; and configuring the routing unit to perform access of a first computing unit of the near-memory computing module to a second computing unit of the near-memory computing module, or access to a first memory unit of the near-memory computing module, or access to a third computing unit or a second memory unit of at least one further near-memory computing module.

According to a preferred embodiment of the construction method of the present application, the construction method further comprises:

connecting the plurality of switching interfaces of the routing unit to each computing unit;

connecting the routing interface of the routing unit to the routing interface of a routing unit of at least one further near-memory computing module; and connecting the memory control interface of the routing unit to each memory unit in each memory submodule.

According to a preferred embodiment of the construction method of the present application, the construction method further comprises:

connecting the switching routing computing unit of the routing unit to the plurality of switching interfaces, the routing interface, and a crossbar switch unit, storing in the switching routing computing unit at least routing information about the near-memory computing module and the plurality of computing units, and configuring the switching routing computing unit to parse a received data access request and control switching of the crossbar switch unit based on parsed data access request;

connecting the memory control unit of the routing unit to the crossbar switch unit and the memory control interface, storing at least routing information of the plurality of memory units in the memory control unit, and configuring the memory control unit, in response to switching of the crossbar switch unit to the memory control unit, to perform secondary parse of the parsed data access request received from the crossbar switch unit to determine a destination memory unit and access the destination memory unit via the memory control interface.

According to a preferred embodiment of the construction method of the present application, the construction method further comprises: configuring each computing unit to access at least one memory unit directly via a routing unit. That is, the routing unit parses the data access request issued by the computing unit, acquires access data from the at least one memory unit directly, and forwards the access data to the computing unit that issued the data access request, wherein the data access request includes at least an address of the at least one memory unit.

According to a preferred embodiment of the construction method of the present application, the construction method further comprises: configuring each computing unit to access at least one further memory unit indirectly via a routing unit. Tat is, the routing unit parses the data access request issued by the computing unit, forwards the parsed data access request to a further computing unit, acquires access data from at least one further memory unit via the further computing unit, and forwards the access data to the computing unit that issued the data access request, wherein the data access request includes at least an address of the at least one further memory unit, wherein the further computing unit can access the at least one further memory unit directly via the routing unit.

According to a preferred embodiment of the construction method of the present application, the construction method further comprises: connecting the routing unit to each memory unit of each memory submodule by means of bonding.

According to a preferred embodiment of the construction method of the present application, the construction method further comprises: setting total data bit width of the connection between the routing unit and each memory unit of each memory submodule to be n multiple of data bit width of a single computing unit, where n is a positive integer.

According to a preferred embodiment of the construction method of the present application, the construction method further comprises: in the computing submodule, arranging the routing unit at the center, and locating the plurality of computing units around the routing unit.

According to a preferred embodiment of the construction method of the present application, the computing submodule further comprises at least two routing units, wherein each routing unit is connected to at least one computing unit, and each routing unit is connected to at least one memory unit of each memory submodule; wherein the construction method further comprises:

connecting the at least two routing units to each other to form an overall routing unit, connecting the overall routing unit to each computing unit, connecting the overall routing unit to each memory unit of each memory submodule, and connecting the overall routing unit to at least one further routing unit of at least one further near-memory computing module;

configuring the overall routing unit to perform the access of the first computing unit of the near-memory computing module to the second computing unit of the near-memory computing module, or to access the first memory unit of the near-memory computing module, or access to the third computing unit or the second memory unit of a further near-memory computing module.

According to a preferred embodiment of the construction method of the present application, the construction method further comprises:

connecting a plurality of switching interfaces of each of the at least two routing units to at least one computing unit;

connecting a routing interface of each of the at least two routing units to a routing interface of at least one further routing unit of the near-memory computing module, and/or connecting a routing interface of each of the at least two routing units to a routing interface of at least one further routing unit of at least one further near-memory computing module;

connecting a memory control interface of each of the at least two routing units to at least one memory unit.

According to a preferred embodiment of the construction method of the present application, the construction method further comprises: connecting the at least two routing units to each other via the routing interface.

According to a preferred embodiment of the construction method of the present application, the construction method further comprises:

connecting the switching routing computing unit of each of the at least two routing units to the plurality of switching interfaces, the routing interface, and a crossbar switch unit, storing in the switching routing computing unit at least routing information about the near-memory computing module and the plurality of computing units, and configuring the switching routing computing unit to parse a received data access request and control switching of the crossbar switch unit based on parsed data access request;

connecting the memory control unit of each of the at least two routing units to the crossbar switch unit and the memory control interface, storing at least routing information of the plurality of memory units in the memory control unit, and configuring the memory control unit, in response to switching of the crossbar switch unit to the memory control unit, to perform secondary parse of the parsed data access request received from the crossbar switch unit to determine the memory unit to be accessed and access the memory unit to be accessed via the memory control interface.

According to a preferred embodiment of the construction method of the present application, the construction method further comprises: configuring each computing unit to access at least one memory unit directly via the overall routing unit. That is, the overall routing unit parses the data access request issued by the computing unit, acquires access data from the at least one memory unit directly, and forwards the access data to the computing unit that issued the data access request, wherein the data access request includes at least an address of the at least one memory unit.

According to a preferred embodiment of the construction method of the present application, the construction method further comprises: configuring each computing unit to access at least one further memory unit indirectly via the overall routing unit. That is, the overall routing unit parses the data access request issued by the computing unit, forwards the parsed data access request to a further computing unit, acquires access data from at least one further memory unit via the further computing unit, and forwards the access data to the computing unit that issued the data access request, wherein the data access request includes at least an address of the at least one further memory unit, wherein the further computing unit can access the at least one further memory unit directly via the overall routing unit.

According to a preferred embodiment of the construction method of the present application, the construction method further comprises:
connecting, by means of bonding connection, the overall routing unit to each memory unit of each memory submodule.

According to a preferred embodiment of the construction method of the present application, the construction method further comprises:
setting total data bit width between each memory unit and the overall routing unit to be n multiple of data bit width of a single computing unit, where n is a positive integer.

According to a preferred embodiment of the construction method of the present application, the construction method further comprises:
in the computing submodule, arranging the at least two routing units at the center, and locating the plurality of computing units around the at least two routing units.

According to a preferred embodiment of the construction method of the present application, the construction method further comprises:
in the computing submodule, arranging the plurality of computing units at the center, and locating the at least two routing units around the plurality of computing units.

According to a preferred embodiment of the construction method of the present application, the construction method further comprises:
arranging the memory unit to include a dynamic random access memory, and arranging the computing unit to include a central processing unit.

According to a preferred embodiment of the construction method of the present application, the construction method further comprises:
determining the number of the memory units in the memory submodule at least according to total data bit width of the plurality of computing units in the computing submodule and data bit width of a single memory unit.

According to a preferred embodiment of the construction method of the present application, further comprising:
setting the storage capacity of the memory unit to be customizable.

According to the eighth aspect of the present application, there is provided a construction method of a near-memory computing network, comprising:
connecting a plurality of near-memory computing modules via a routing unit, wherein the plurality of near-memory computing modules are a plurality of near-memory computing modules mentioned above.

According to a preferred embodiment of the construction method of the present application, the construction method further comprises:
connecting the plurality of near-memory computing modules into bus, star, ring, tree, mesh and hybrid topologies.

According to a preferred embodiment of the construction method of the present application, the construction method further comprises:
connecting the plurality of near-memory computing modules via routing units by metal wires.

BRIEF DESCRIPTION OF THE DRAWINGS

The present application will be more easily understood from the following description with reference to the drawings, in which.

DETAILED DESCRIPTION OF THE INVENTION

The embodiments of the present application will be further described in detail below with reference to the drawings.

Figure 1:
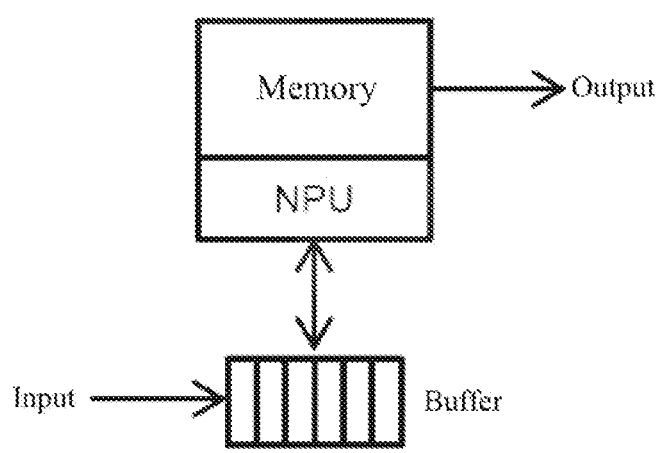
FIG. 1 is a schematic diagram of a near-memory computing structure in the prior art.
Figure 2:
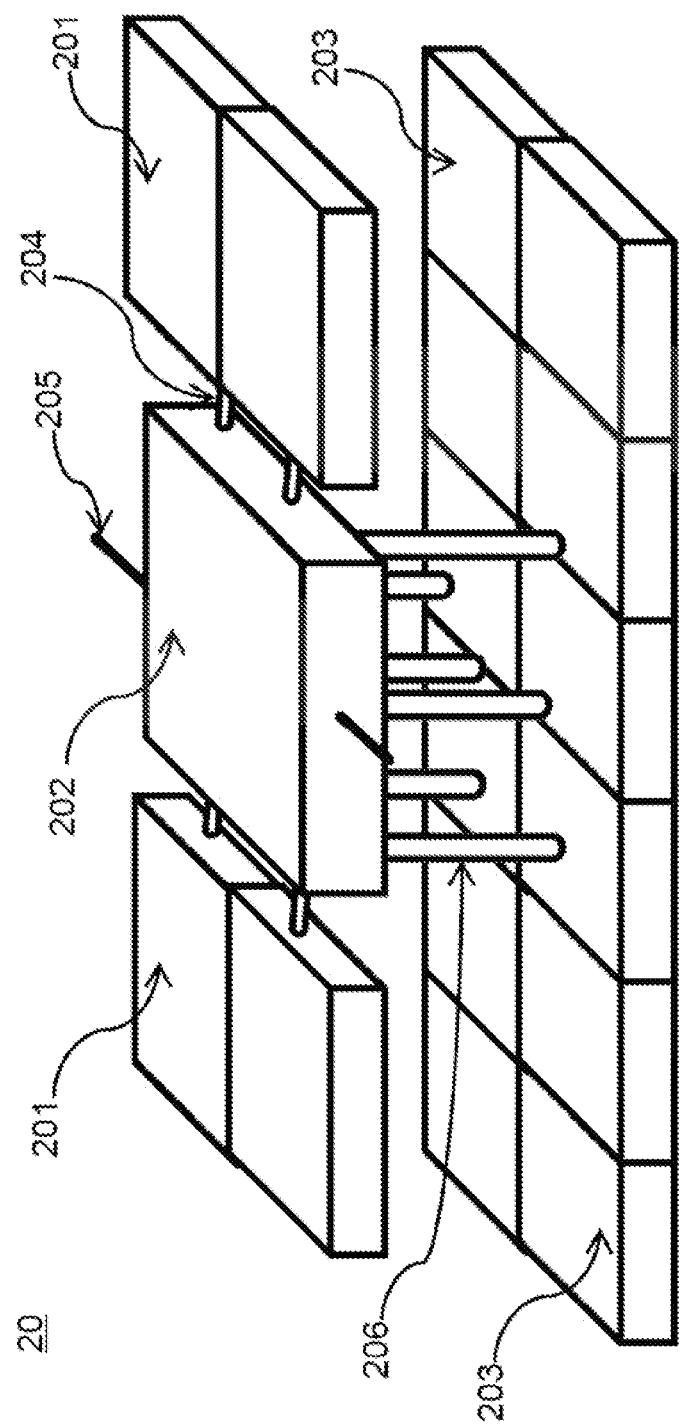
FIG. 2 is a schematic diagram of a near-memory computing module according to an embodiment of the present application.

FIG. 2 is a schematic diagram of a near-memory computing module 20 according to an embodiment of the present application.

The near-memory computing module 20 shown in FIG. 2 comprises one computing submodule (the "layer" or submodule where the computing unit 201 and the routing unit 202 are located) and one memory submodule (the "layer" or submodule where the memory unit 203 is located), and the memory submodule is arranged on one side of the computing submodule (as shown in FIG. 2, the memory submodule is arranged below the computing submodule).

Nonetheless, the present application is not limited to one memory submodule, and may involve more than one memory submodule. In the case of more than one memory submodule, these memory submodules may be arranged on both sides of the computing submodule (for example, referring to the circumstances in FIG. 2 where the memory submodule is arranged below the computing submodule, in the case where the memory submodules are arranged on both sides of the computing submodule, these memory submodules may also be arranged above the computing submodule in FIG. 2).

The computing submodule and the memory submodule shown in FIG. 2 are positioned very closely, are located in the same chip and constitute a complete system. The complete system is also referred to as a near-memory computing module, also referred to as a near-memory computing node.

As shown in FIG. 2, the computing submodule comprises four computing units 201 and one routing unit 202, and the memory submodule comprises twelve memory units 203. Since the computing submodule and the memory submodule are located in the same chip, the computing unit 201 and the memory unit 203 are also integrated together, so that the latency is very small when the computing unit 201 accesses the memory unit 203.

The memory unit 203 is a unit for storing operation data in the computing unit 201 and data exchanged with an external storage such as a hard disk. Since the technology of dynamic random access memory is relatively mature, the memory unit 203 is preferably a dynamic random access memory in the present application.

The number of memory units 203 is determined at least according to the total data bit width of the computing units 201 in the computing submodule and the data bit width of a single memory unit 203.

For example, if there are four computing units 201 in the computing submodule, the total data bit width of the four computing units 201 is 96 bits, and the data bit width of a single memory unit 203 is 8 bits, then the required number of memory units 203 is twelve (as shown in FIG. 2).

In addition, the storage capacity of the memory unit 203 can also be customized according to requirements.

The computing unit 201 is a final execution unit for information processing and program run, preferably a central processing unit.

The routing unit 202 is connected to each computing unit 201 and each memory unit 203. In addition, the routing unit 202 is connected to the routing unit 202 of at least one further near-memory computing module. The main function of the routing unit 202 is to perform access of a computing unit 201 of a near-memory computing module to a further computing unit 202 of the near-memory computing module, or access to a memory unit 203 of the near-memory computing module, or access to a computing unit 202 or a memory unit 203 of at least one further near-memory computing module.

Each computing unit 201 can access the memory unit 203 corresponding to the computing unit "directly" via the routing unit 202.

For example, referring to FIG. 2, it is assumed that the computing unit 201 in the upper left corner can access the three memory units 203 in the upper left corner "directly" via the routing unit 202; the computing unit 201 in the lower left corner can access the three memory units 203 in the lower left corner "directly" via the routing unit 202; the computing unit 201 in the upper right corner can access the three memory units 203 in the upper right corner "directly" via the routing unit 202, and the computing unit 201 in the lower right corner can access the three memory units 203 in the lower right corner "directly" via the routing unit 202. Here, "upper left corner", "lower left corner", "upper right corner" and "lower right corner" refer to orientations when the reader observes FIG. 2 from the horizontal direction of FIG. 2 (the horizontal direction of FIG. 2 is longer than the vertical direction of FIG. 2) and are orientations relative to the routing unit 202, and these orientations are assumed here for illustration purposes.

That is to say, if the computing unit 201 in the upper left corner issues a data access request to any of the three memory units 203 in the upper left corner, the routing unit 202 can parse the data access request, acquires access data "directly" from any of the three memory units 203 and returns the access data to the computing unit 201 in the upper left corner.

In addition, each computing unit 201 can access further memory units 203 "directly" via the routing unit 202.

Referring again to FIG. 2 and continuing the previous assumption, if the computing unit 201 in the upper left corner issues a data access request to any of the three memory units 203 in the upper right corner, the routing unit 202 can parse the data access request and sends the parsed data access request to the computing unit 201 in the upper right corner, acquires access data from any of the three memory units 203 in the upper right corner "indirectly" via the computing unit 201 in the upper right corner and returns the access data to the computing unit 201 in the upper left corner.

That is to say, the computing unit 201 can "directly" or "indirectly" access all the memory units 203 in a near-memory computing module via the routing unit 202. The specific structure of the routing unit 202 will be described in further detail later with respect to FIG. 3.

FIG. 2 shows an embodiment of the arrangement of a plurality of computing units 201 and the routing unit 202 in the computing submodule, wherein the plurality of computing units 201 surround the routing unit 202 on both sides. Nonetheless, this arrangement is illustrative rather than limiting.

The circumstances where the plurality of computing units 201 surround the routing unit 202, or the plurality of computing units 201 are distributed on one side of the routing unit 202 and the like also fall within the scope of the present application.

In FIG. 2, data interfaces of the computing submodule and the memory submodule need to be connected by means of the routing unit 202, preferably using a three-dimensional connection 206 process.

Common three-dimensional connection 206 processes include bonding connection methods, Through-Silicon Vias (TSV), flip-chip and wafer-level packaging. In the present application, the three-dimensional connection 206 process is preferably a bonding connection method.

Bonding connection is a common three-dimensional connection process, which is a wafer stacking process within a chip. Specifically, bonding connection is to connect wafers together by metal wires through a certain process so as to achieve the required electrical characteristics.

In addition, in order to ease the data transmission pressure, the total data bit width of the connection between each memory unit 203 in the memory submodule and the routing unit 202 in the computing submodule should be n multiple of the data bit width of a single computing unit 201 in the computing submodule, where n is a positive integer.

In FIG. 2, the access between the computing unit 201 in the computing submodule and the memory unit 203 in the memory submodule needs to be realized via the connection between the routing units 202. If the total data bit width of the connection is the same as that of a single computing unit 201, in the case of frequent data access operations (i.e. in the case of high data throughput) between the computing unit 201 in the computing submodule and the memory unit 203 in the memory submodule, the data throughput rate between the computing unit 201 in the computing submodule and the memory unit 203 in the memory submodule also increases accordingly, and the connection may be congested. Therefore, the total data bit width of the connection is set to be a positive integer multiple of the data bit width of a single computing unit 201.

It should be understood that the specific value of the positive integer n is set according to business requirements. For example, in common system design, the bandwidth requirements for data transmission between different computing submodules within a chip can be derived according to business simulation, and the required data bit width can be derived according to the bandwidth requirements.

Assuming that the required data bandwidth between the computing unit 201 in the computing submodule and the memory unit 203 in the memory submodule is 144 Gb/s, and the total data bit width of the existing connection is 72b and the clock is 1 GHz, then the total data bandwidth of the connection will be 72 Gb/s. In this case, it is necessary to increase the total data bit width of the connection to 144$b$ to adapt to the data bandwidth requirement.

Figure 3:
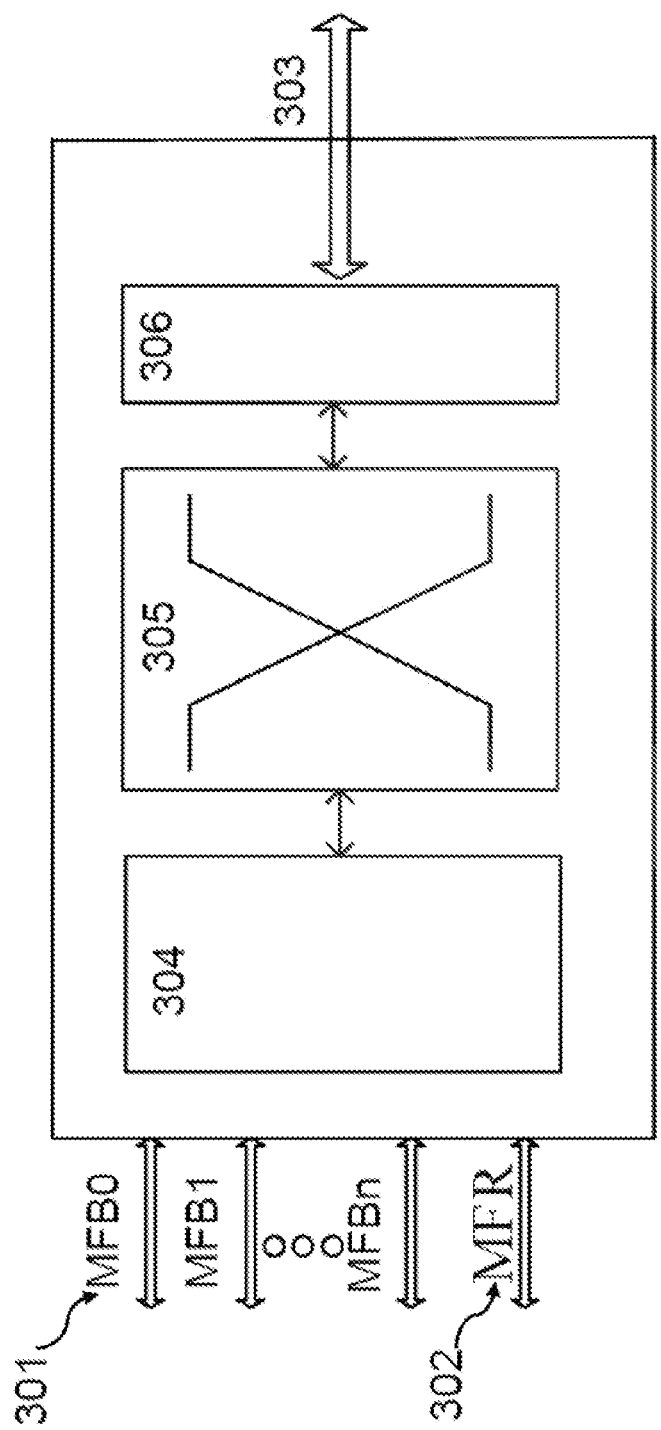
FIG. 3 is a schematic diagram of a routing unit according to an embodiment of the present application.

FIG. 3 is a schematic diagram of a routing unit 202 according to an embodiment of the present application.

FIG. 3 shows the external interfaces of the routing unit 202, and these external interfaces mainly include switching interfaces, a routing interface and a memory control interface. It should be understood that in order not to obscure the gist of the present application, FIG. 3 only shows the external interfaces involved in the present application, and these external interfaces are exemplary rather than limiting.

In FIG. 3, the switching interfaces are shown as Memory Front Bus (MFB) interfaces 301, which are respectively connected to the computing units 201 (shown in FIG. 2).

The routing interface is shown as a Memory Front Routing (MFR) interface 302, which is connected to a routing interface of a routing unit of at least one further near-memory computing module.

The memory control interface is shown as a DDR operation interface (DDRIO-bonding), which is connected to the memory unit 203.

FIG. 3 shows additionally the internal structures of the routing unit 202, which mainly include a switching routing computing unit 304, a crossbar switch unit 305 and a memory control unit 306. It should be understood that in order not to obscure the gist of the present application, FIG. 3 only shows the internal structures involved in the present application, and these internal structures are exemplary rather than limiting. It should be understood that the routing unit 202 should also include some buffer circuits, digital and analog circuits, and the like. For example, the buffer circuits may buffer and prioritize data access requests from the plurality of computing units 201, and the digital and analog circuits, for example, may operate in cooperation with the memory control unit 306, and so on.

In the present application, the switching routing computing unit 304 stores routing information about the computing unit 201. The routing information may be stored in a form of, for example, a routing table. Thus, the switching route computing unit 304 can determine information about whether the computing unit 201 in the data access request can "directly" access information of a memory unit via a router, and the like.

In addition, the switching routing computing unit 304 also stores routing information about the near-memory computing module. The routing information may also be stored in the form of, for example, a routing table. In this way, the switching routing computing unit 304 can determine which near-memory computing module does the memory address or destination computing unit address indicate (in the present near-memory computing module or in a further near-memory computing module) and the like. For example, based on information at a specific position (such as the first bit) in the destination memory address or destination computing unit address and the routing information, the switching routing computing unit 304 can judge which near-memory computing module does the destination memory address or destination computing unit address indicate. For example, if the first bit of the destination memory address or destination computing unit address is 1, it is represented that the destination memory or destination computing unit is in the first near-memory computing module; if the first bit of the destination memory address or destination computing unit address is 3, it is represented that the destination memory or destination computing unit is in the third near-memory computing module.

In addition, the switching routing computing unit 304 can receive a data access request from a switching interface, and can also receive the data access request from a routing interface. In the case where the computing submodule 201 of the near-memory computing module comprises a single routing unit (as shown in FIG. 2), the switching routing computing unit 304 receives a data access request issued by the computing unit of the computing submodule 201 of the present near-memory computing module via a switching interface, and receives the data access request issued by the computing unit of a further near-memory computing module via a routing interface.

The memory control unit 306 stores routing information about the memory unit 203. Thus, the memory control unit 306 can determine the port information corresponding to the memory unit in the data access request, and so on.

Figure 4:
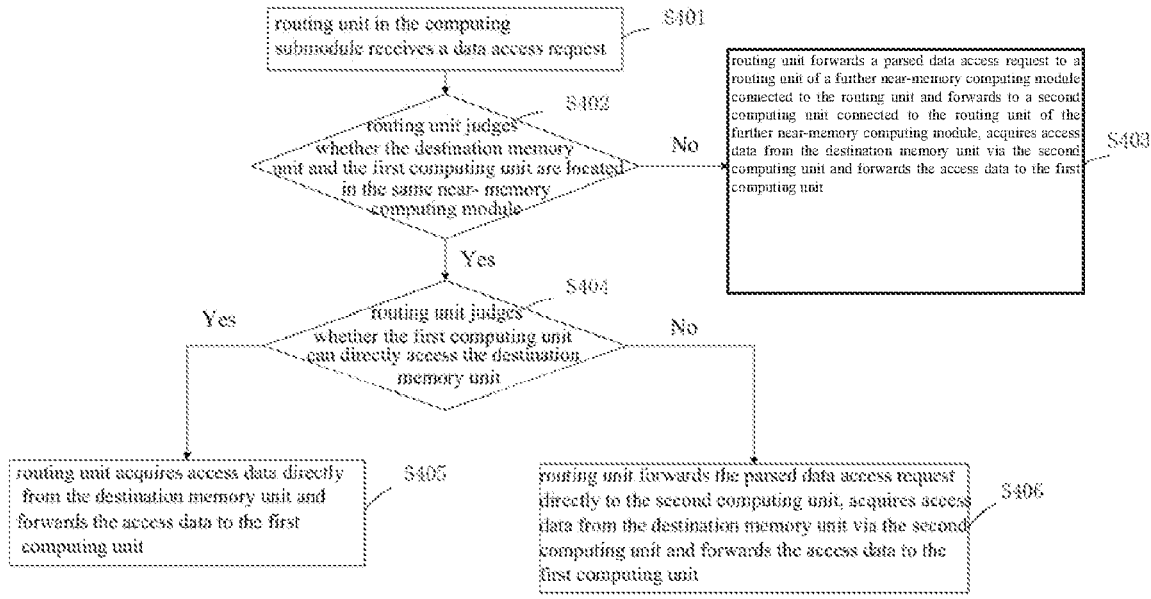
FIG. 4 is a flowchart of a near-memory computing method according to an embodiment of the present application.

FIG. 4 is a flowchart of a near-memory computing method according to an embodiment of the present application.

The near-memory computing method comprises the following steps:

Step S401: The routing unit in the computing submodule receives a data access request, which is issued by a first computing unit in the computing submodule and includes at least an address of a destination memory unit.

Step S402: The routing unit receives a data access request via a switching interface, parses the data access request, and judges whether the destination memory unit and the first computing unit are located in the same near-memory computing module.

If the destination memory unit and the first computing unit are not located in the same near-memory computing module, step S403 is executed: the routing unit forwards the parsed data access request to a routing unit of a further near-memory computing module connected to the routing unit and forwarding to a second computing unit connected to the routing unit of the further near-memory computing module, acquires access data from the destination memory unit via the second computing unit and forwards the access data to the first computing unit.

If the destination memory unit and the first computing unit are located in the same near-memory computing module, step S404 is executed: the routing unit judges whether the first computing unit can directly access the destination memory unit.

If the first computing unit can directly access the destination memory unit, step S405 is executed: the routing unit acquires access data directly from the destination memory unit and forwards the access data to the first computing unit.

If the first computing unit cannot directly access the destination memory unit, step S406 is executed: the routing unit forwards the parsed data access request directly to the second computing unit, acquires access data from the destination memory unit via the second computing unit and forwards the access data to the first computing unit.

The method flowchart in FIG. 4 is merely schematic, and does not have to be performed in this order.

For example, it is possible to first judge whether the first computing unit can directly access the destination memory unit, and then judge whether the destination memory unit and the first computing unit are located in the same near-memory computing module.

Figure 5:
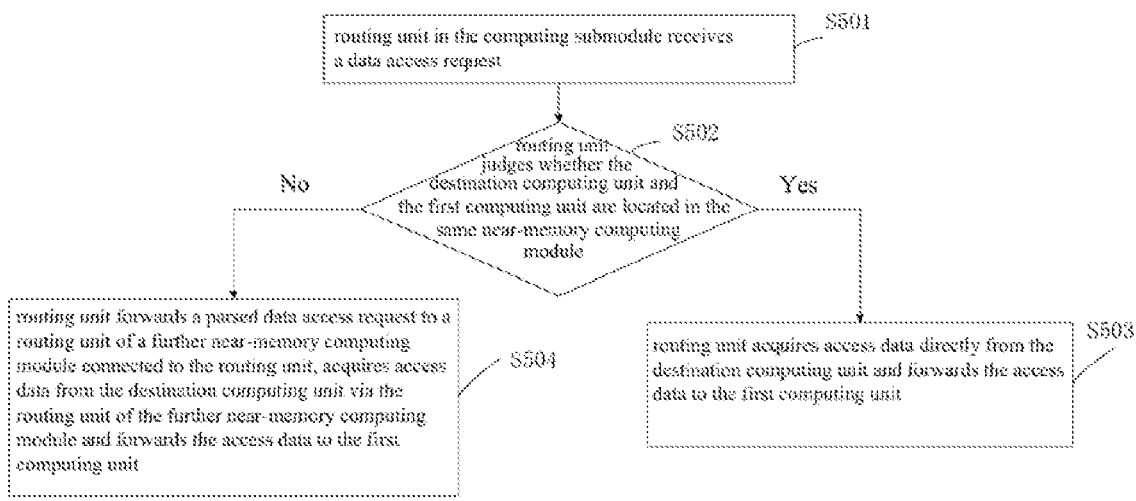
FIG. 5 is a flowchart of a near-memory computing method according to another embodiment of the present application.

FIG. 5 is a flowchart of a near-memory computing method according to another embodiment of the present application.

The near-memory computing method comprises the following steps:

Step S501: The routing unit in the computing submodule receives a data access request, which is issued by the first computing unit in the computing submodule and includes at least an address of the destination computing unit.

Step S502: The routing unit receives a data access request via a switching interface, parses the data access request, and judges whether the destination computing unit and the first computing unit are located in the same near-memory computing module.

If the destination computing unit and the first computing unit are located in the same near-memory computing module, step S503 is executed: the routing unit acquires access data directly from the destination computing unit and forwards the access data to the first computing unit.

If the destination computing unit and the first computing unit are not located in the same near-memory computing module, step S504 is executed: the routing unit forwards the parsed data access request to a routing unit of a further near-memory computing module connected to the routing unit, acquires access data from the destination computing unit via the routing unit of the further near-memory computing module and forwards the access data to the first computing unit.

With reference to FIG. 2 and FIG. 3, the external interface and internal structure of the routing unit 202 and the near-memory computing method in FIG. 5 and FIG. 6 will be further understood with respect to the following five scenarios of data stream processing in the near-memory computing module below.

Referring again to FIG. 2, it is still assumed that the computing unit 201 in the upper left corner can "directly" access the three memory units 203 in the upper left corner via the routing unit 202; the computing unit 201 in the lower left corner can "directly" access the three memory units 203 in the lower left corner via the routing unit 202; the computing unit 201 in the upper right corner can "directly" access the three memory units 203 in the upper right corner via the routing unit 202, and the computing unit 201 in the lower right corner can "directly" access the three memory units 203 in the lower right corner via the routing unit 202.

In addition, it is assumed that the computing unit 201 in the upper left corner is connected to the routing unit 202 via a switching interface MFB0, and the computing unit 201 in the lower left corner is connected to the routing unit 202 via a switching interface MFB1.

Scenario (I): The computing unit 201 in the upper left corner accesses any of the three memory units 203 in the upper left corner.

The computing unit 201 in the upper left corner issues a data access request to the switching routing computing unit 304 via the switching interface MFB0. The switching routing computing unit 304 parses the data access request to obtain a destination memory address, and judges whether the destination memory address is in the same near-memory computing module as the computing unit 201 (but does not parse out the specific memory unit) (in this case, it is judged that the destination memory address is in the same near-memory computing module as the computing unit 201), and judges whether the computing unit 201 in the upper left corner can "directly" access the three memory units 203 in the upper left corner (in this case, it is judged that the computing unit 201 in the upper left corner can "directly" access the three memory units 203 in the upper left corner).

Afterwards, the switching routing computing unit 304 queries a destination memory address from the routing information about the computing unit and the near-memory computing module stored therein, determines the port information corresponding to the destination memory address, and then controls the open and close of the crossbar switch unit 305, so that the parsed data access request is sent to the memory control unit 306 for secondary analysis to obtain which memory unit needs to be specifically accessed (any of the three memory units 203 in the upper left corner). Then, the switching routing computing unit 304 accesses any of the three memory units 203 in the upper left corner via the memory control (DDRIO-bonding) interface.

Scenario (II): The computing unit 201 in the upper left corner accesses any of the three memory units 203 in the lower left corner.

The computing unit 201 in the upper left corner issues a data access request to the switching routing computing unit 304 via the switching interface MFB0. The switching routing computing unit 304 parses the data access request to obtain a destination memory address, and judges whether the destination memory address is in the same near-memory computing module as the computing unit 201 (but does not parse out the specific memory unit) (in this case, it is judged that the destination memory address is in the same near-memory computing module as the computing unit 201), and judges whether the computing unit 201 in the upper left corner can "directly" access the three memory units 203 in the upper left corner (in this case, it is judged that the computing unit 201 in the upper left corner cannot "directly" access the three memory units 203 in the upper left corner).

Afterwards, the switching routing computing unit 304 queries a destination memory address from the routing information about the computing unit and the near-memory computing module stored therein, determines the port information corresponding to the destination memory address, and then controls the open and close of the crossbar switch unit 305, so that the parsed data access request is sent to the computing unit 201 in the lower left corner via the switching interface MFB1. The computing unit 201 in the lower left corner performs the operation as in the scenario (I), and then accesses any of the three memory units 203 in the upper left corner via the memory control (DDRIO-bonding) interface.

Scenario (III): The computing unit 201 in the upper left corner accesses the memory unit 203 of a further near-memory computing module.

The computing unit 201 in the upper left corner issues a data access request to the switching routing computing unit 304 via the switching interface MFB0. The switching routing computing unit 304 parses the data access request to obtain a destination memory address, and judges whether the destination memory address is in the same near-memory computing module as the computing unit 201 (but does not parse out the specific memory unit) (in this case, it is judged that the destination memory address is in the same near-memory computing module as the computing unit 201).

Afterwards, the switch routing computing unit 304 controls the open and close of the crossbar switch unit 305, and issues the parsed data access request to a further near-memory computing module via the routing interface MFR.

The further near-memory computing module performs the operations as in the above-mentioned scenarios (I) and (II), and then accesses a memory unit 203 of a further near-memory computing module via the memory control (DDRIO-bonding) interface of the routing unit of the further near-memory computing module.

Scenario (IV): The computing unit 201 in the upper left corner accesses the computing unit 201 in the lower left corner.

The computing unit 201 in the upper left corner issues a data access request to the switching routing computing unit 304 via the switching interface MFB0. The switching routing computing unit 304 parses the data access request to obtain a destination computing unit address, and judges whether the destination computing unit address is in the same near-memory computing module as the computing unit 201 (in this case, it is judged that the destination computing unit address is in the same near-memory computing module as the computing unit 201).

Afterwards, the switching routing computing unit 304 queries a destination computing unit address from the routing information about the computing unit and the near-memory computing module stored therein, determines the port information corresponding to the destination computing unit address, and then controls the open and close of the crossbar switch unit 305. The switching routing computing unit 304 accesses the computing unit 201 in the lower left corner via the switching interface MFB1.

Scenario (V): The computing unit 201 in the upper left corner accesses the computing unit 201 of a further near-memory computing module.

The computing unit 201 in the upper left corner issues a data access request to the switching routing computing unit 304 via the switching interface MFB0. The switching routing computing unit 304 parses the data access request to obtain a destination computing unit address, and judges whether the destination computing unit address is in the same near-memory computing module as the computing unit 201 (in this case, it is judged that the destination computing unit address is not in the same near-memory computing module as the computing unit 201).

Afterwards, the switching routing computing unit 304 controls the open and close of the crossbar switch unit 305, and issues the parsed data access request to a further near-memory computing module via the routing interface MFR The further near-memory computing module performs the operation as in the above-mentioned scenario (IV), and then accesses the computing unit 201 of a further near-memory computing module via the switching interface 301 of the routing unit of the further near-memory computing module.

Figure 6:
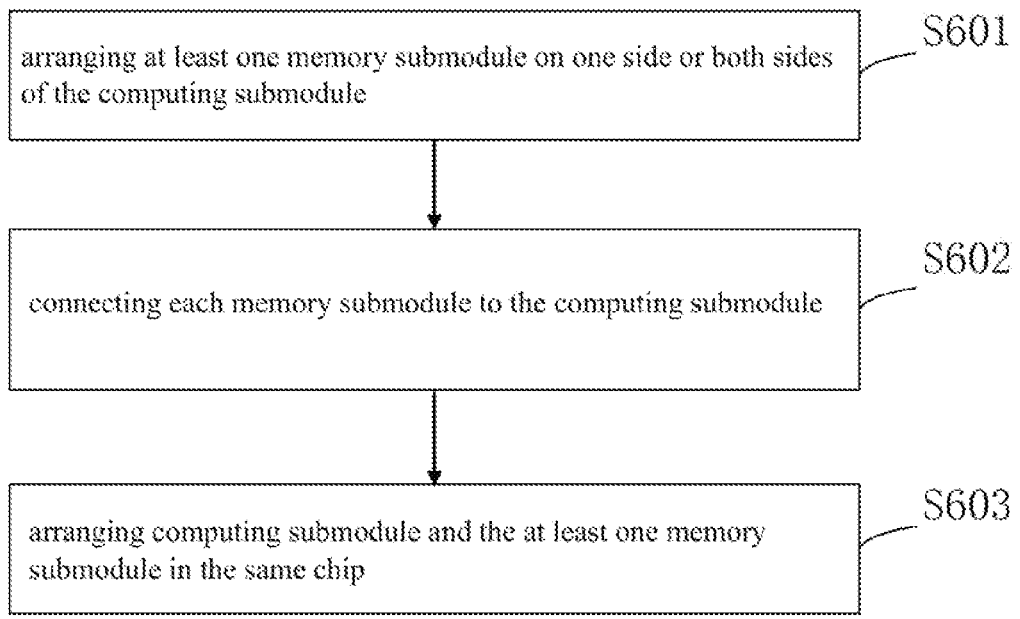
FIG. 6 is a flowchart of a construction method of a near-memory computing module according to an embodiment of the present application.

FIG. 6 is a flowchart of a construction method of a near-memory computing module according to an embodiment of the present application.

The construction method of the near-memory computing module comprises the following steps:

Step S601: Arranging at least one memory submodule on one side or both sides of the computing submodule, wherein each memory submodule comprises a plurality of memory units 203, and the computing submodule comprises a plurality of computing units 201.

Step S602: Connecting each memory submodule to the computing submodule.

Step S603: Arranging the computing submodule and the at least one memory submodule in the same chip.

Figure 7:
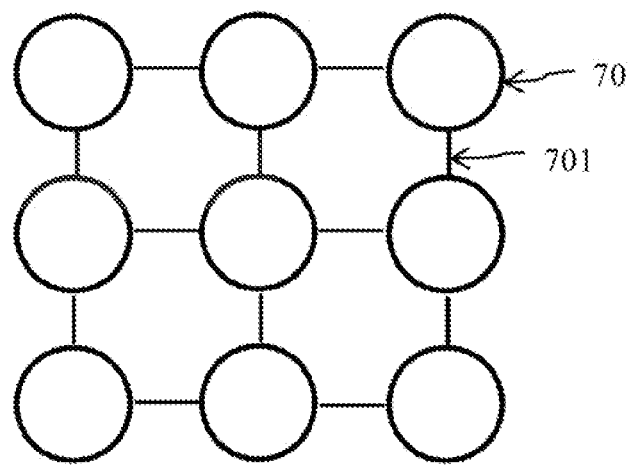
FIG. 7 is a schematic diagram of a near-memory computing network according to an embodiment of the present application.

FIG. 7 is a schematic diagram of a near-memory computing network according to an embodiment of the present application.

The near-memory computing network shown in FIG. 7 comprises a plurality of near-memory computing modules 70, which are a plurality of near-memory computing modules as mentioned above, and are connected to each other via routing units.

High data bandwidth and high performance computation can be achieved through the interconnection and topology of near-memory computing modules.

FIG. 7 shows a typical mesh topology. It should be understood that a plurality of near-memory computing modules can also be connected into bus, star, ring, tree and hybrid topologies.

In the present application, the plurality of near-memory computing modules are connected to each other via routing units by metal wire connection 701. The metal wire connection herein is a metal wire connection traditionally used in two-dimensional connections.

In the present application, the computing submodule comprising a single routing unit 211 serves as an example. Nonetheless, the present application is not limited to one routing unit, and may comprise more than one routing unit. In the case of more than one routing unit, these routing units can be connected via routing interfaces MFR (similar to the operation between the routing interface MFR of one near-memory computing module and the routing interface MFR of a further near-memory computing module) to form an overall routing unit.

The overall routing unit presents the same functions to the outside as the single routing unit 202 shown in FIG. 2. The overall routing unit differs from the single routing unit 202 in FIG. 2 in that each routing unit in the overall routing unit is not connected to each memory unit in the memory submodule. In addition, since the computing submodule comprises more than one routing unit, the switching routing computing unit 304 will receive a data access request issued by the computing unit of the computing submodule in the present near-memory computing module via a switching interface or a routing interface, and a data access request issued by a computing unit of a further near-memory computing module via a routing interface.

For example, if there are two routing units in the computing submodule, the two routing units constitute an overall routing unit. For example, it is assumed that there are two routing units in FIG. 2, i.e. a routing unit A and a routing unit B, wherein the routing unit A is connected to the computing unit 201 in the upper left corner and the computing unit 201 in the lower left corner, and is also connected to the three memory units 203 in the upper left corner and the three memory units 203 in the lower left corner, and the routing unit B is connected to the computing unit 201 in the upper right corner and the computing unit 201 in the lower right corner, and is also connected to the three memory units 203 in the upper right corner and the three memory units 203 in the lower right corner.

If the computing unit 201 in the upper left corner connected to the routing unit A needs to access any of the three memory units 203 in the lower right corner, the access requires to be performed via the routing interface MFR between the routing unit A and the routing unit B. The operation is similar to the above-mentioned scenario (III). The specific description is as follows:

In the routing unit A, the computing unit 201 in the upper left corner issues a data access request to the switching routing computing unit 304 via the switching interface MFB0. The switching routing computing unit 304 parses the data access request to obtain a destination memory address, and judges whether the destination memory address is within the addressing range of the routing unit A (in this case, it is judged that the destination memory address is not within the addressing range of the routing unit A). Afterwards, the switching routing computing unit 304 controls the open and close of the crossbar switch unit 305, issues the parsed data access request to the routing unit B via the routing interface MFR, and accesses any of the three memory units 203 in the lower right corner via the routing unit B.

It should be noted that the above-mentioned embodiments illustrate rather than limit the invention, and that the person skilled in the art will be able to design many alternative embodiments without departing from the scope of the appended claims. It should be understood that the scope of the present application is defined by the claims.

The invention claimed is:

1. A near-memory computing module, comprising:
   a computing submodule, which comprises a plurality of computing units; and
   at least one memory submodule, which is arranged on at least one side of the computing submodule, wherein each memory submodule comprises a plurality of memory units, and each memory submodule is connected to the computing submodule;
   wherein the computing submodule and the at least one memory submodule are located in the same chip,
   wherein the computing submodule further comprises a routing unit,
   wherein the routing unit is connected to each computing unit, the routing unit is connected to each memory unit of each memory submodule, and the routing unit is connected to a routing unit of at least one further near-memory computing module, and
   wherein the routing unit is configured to perform access of a first computing unit of the near-memory computing module to a second computing unit of the near-memory computing module, or access to a first memory unit of the near-memory computing module, or access to a third computing unit or a second memory unit of at least one further near-memory computing module.

2. The near-memory computing module according to claim 1, wherein the routing unit comprises:
   a plurality of switching interfaces, which connects the routing unit to each computing unit;
   a routing interface, which connects the routing unit to a routing interface of a routing unit of at least one further near-memory computing module; and
   a memory control interface, which connects the routing unit to each memory unit in each memory submodule.

3. The near-memory computing module according to claim 2, wherein the routing unit further comprises:
   a crossbar switch unit;
   a switching routing computing unit, wherein the switching routing computing unit is connected to the plurality of switching interfaces, the routing interface, and the crossbar switch unit, wherein the switching routing computing unit stores at least routing information about the near-memory computing module and the plurality of computing units, and wherein the switching routing computing unit parses a received data access request and controls switching of the crossbar switch unit based on parsed data access request;
   a memory control unit, wherein the memory control unit is connected to the crossbar switch unit and the memory control interface, wherein the memory control unit stores at least routing information about the plurality of memory units, and wherein the memory control unit, in response to the switching of the crossbar switch unit to the memory control unit, performs secondary parse of the parsed data access request received from the crossbar switch unit to determine a destination memory unit, and accesses the destination memory unit via the memory control interface.

4. The near-memory computing module according to claim 1, wherein each computing unit accesses at least one memory unit directly via the routing unit.

5. A near-memory computing module, comprising:
   a computing submodule, which comprises a plurality of computing units;
   at least one memory submodule, which is arranged on at least one side of the computing submodule, wherein each memory submodule comprises a plurality of memory units, and each memory submodule is connected to the computing submodule;
   wherein the computing submodule and the at least one memory submodule are located in the same chip;
   wherein the computing submodule further comprises at least two routing units, each of which is connected to at least one computing unit, and each of which is connected to at least one memory unit of each memory submodule;
   wherein the at least two routing units are connected to each other to form an overall routing unit, wherein the overall routing unit is connected to each computing unit, and is connected to each memory unit of each memory submodule, and is connected to at least one further routing unit of at least one further near-memory computing module;
   wherein the overall routing unit is configured to perform an access of a first computing unit of the near-memory computing module to a second computing unit of the near-memory computing module, or access to a first memory unit of the near-memory computing module, or access to a third computing unit or a second memory unit of at least one further near-memory computing module.

6. The near-memory computing module according to claim 5, wherein each of the at least two routing units comprises:
   a plurality of switching interfaces, which connect the routing unit to at least one computing unit;
   a routing interface, which connects the routing unit to at least one further routing unit of the near-memory computing module, and/or which connects the routing unit to at least one further routing unit of at least one further near-memory computing module;
   a memory control interface, which connects the routing unit to at least one memory unit.

7. The near-memory computing module according to claim 6, wherein the at least two routing units are connected to each other via a routing interface.

8. The near-memory computing module according to claim 6, wherein each of the at least two routing units further comprises:
   a crossbar switch unit;
   a switching routing computing unit, wherein the switching routing computing unit is connected to the plurality of switching interfaces, the routing interface, and the crossbar switch unit, wherein the switching routing computing unit stores at least routing information about the near-memory computing module and the plurality of computing units, and wherein the switching routing computing unit parses a received data access request and controls switching of the crossbar switch unit based on parsed data access request;

a memory control unit, wherein the memory control unit is connected to the crossbar switch unit and the memory control interface, wherein the memory control unit stores at least routing information about the plurality of memory units, and wherein the memory control unit, in response to switching of the crossbar switch unit to the memory control unit, performs secondary parsing of the parsed data access request received from the crossbar switch unit to determine the memory unit to be accessed, and accesses the memory unit to be accessed via the memory control interface.

9. The near-memory computing module according to claim 5, wherein each computing unit accesses at least one memory unit directly via the overall routing unit.

10. The near-memory computing module according to claim 5, wherein in the computing submodule, the at least two routing units are located at the center, and the plurality of computing units are distributed around the at least two routing units.

11. A near-memory computing method, which is used for a near-memory computing module, wherein the near-memory computing module comprises: a computing submodule, which comprises a plurality of computing units and a routing unit, wherein the routing unit is connected to each computing unit, the routing unit is connected to each memory unit of each memory submodule, and the routing unit is connected to a routing unit of at least one further near-memory computing module; at least one memory submodule, which is arranged on at least one side of the computing submodule, wherein each memory submodule comprises a plurality of memory units, and each memory submodule is connected to the computing submodule; wherein the computing submodule and the at least one memory submodule are located in the same chip; wherein the near-memory computing method comprising the following steps carried out by a routing unit:

receiving a data access request, wherein the data access request is issued by a first computing unit and includes at least an address of a destination memory unit; and, parsing the data access request, acquiring access data from the destination memory unit, and forwarding the access data to the first computing unit.

12. The near-memory computing method according to claim 11, further comprising the following steps carried out by the routing unit connected to the first computing unit:

after the routing unit parses the data access request and before the routing unit acquires access data from the destination memory unit, judging whether the first computing unit can access the destination memory unit directly via the routing unit connected to the first computing unit;

under the condition that the first computing unit can access the destination memory unit directly via the routing unit connected to the first computing unit, acquiring access data directly from the destination memory unit and forwarding the access data to the first computing unit; and under the condition that the first computing unit cannot access the destination memory unit directly via the routing unit connected to the first computing unit, forwarding the parsed data access request to a second computing unit, and acquiring access data from the destination memory unit via the second computing unit and forwarding the access data to the first computing unit.

13. The near-memory computing method according to claim 12, further comprising the following steps carried out by the routing unit connected to the first computing unit:

under the condition that the first computing unit cannot access the destination memory unit directly via the routing unit connected to the first computing unit and before the routing unit connected to the first computing unit forwards the parsed data access request to a second computing unit, judging whether the destination memory unit and the first computing unit are located in the same near-memory computing module;

under the condition that the destination memory unit and the first computing unit are located in the same near-memory computing module, forwarding the parsed data access request directly to a second computing unit, acquiring access data from the destination memory unit via the second computing unit and forwarding the access data to the first computing unit, wherein the second computing unit can access the destination memory unit directly via the routing unit connected to the first computing unit;

under the condition that the destination memory unit and the first computing unit are not located in the same near-memory computing module, forwarding the parsed data access request to a routing unit of at least one further near-memory computing module connected to the routing unit connected to the first computing unit and forwarding to a second computing unit connected to the routing unit of the at least one further near-memory computing module, and acquiring access data from the destination memory unit via the second computing unit and forwarding the access data to the first computing unit, wherein the second computing unit can access the destination memory unit directly via the routing unit of the at least one further near-memory computing module.

14. The near-memory computing method according to claim 11, the near-memory computing method comprising the following steps carried out by a routing unit:

receiving a data access request, wherein the data access request is issued by a first computing unit and includes at least an address of a destination computing unit; and, parsing the data access request, acquiring access data from the destination computing unit, and forwarding the access data to the first computing unit; and wherein the near-memory computing method further comprises the following steps carried out by the routing unit connected to the first computing unit:

after the routing unit parses the data access request and before the routing unit acquires access data from the destination computing unit, judging whether the destination computing unit and the first computing unit are located in the same near-memory computing module;

under the condition that the destination computing unit and the first computing unit are located in the same near-memory computing module, acquiring access data directly from the destination computing unit and forwarding the access data to the first computing unit;

under the condition that the destination computing unit and the first computing unit are not located in the same near-memory computing module, forwarding the parsed data access request to a routing unit of at least one further near-memory computing module connected to the routing unit, and acquiring access data from the destination computing unit via the routing unit of the at least one further near-memory computing module and forwarding the access data to the first computing unit.

15. The near-memory computing method according to claim 11, wherein the computing submodule further comprises at least two routing units, each of which is connected to at least one computing unit, and each of which is connected to at least one memory unit of each memory submodule; wherein the at least two routing units are connected to each other to form an overall routing unit, wherein the overall routing unit is connected to each computing unit, and is connected to each memory unit of each memory submodule, and is connected to at least one further routing unit of at least one further near-memory computing module; wherein the near-memory computing method comprising the following steps carried out by an overall routing unit:
   receiving a data access request, wherein the data access request is issued by a first computing unit and includes at least an address of a destination memory unit; and,
   parsing the data access request, acquiring access data from the destination memory unit, and forwarding the access data to the first computing unit.

16. The near-memory computing method according to claim 15, comprising the following steps carried out by the overall routing unit connected to the first computing unit:
   after the overall routing unit parses the data access request and before the overall routing unit acquires access data from the destination memory unit, judging whether the first computing unit can access the destination memory unit directly via the overall routing unit connected to the first computing unit;
   under the condition that the first computing unit can access the destination memory unit directly via the overall routing unit connected to the first computing unit, acquiring access data directly from the destination memory unit and forwarding the access data to the first computing unit; and
   under the condition that the first computing unit cannot access the destination memory unit directly via the overall routing unit connected to the first computing unit, forwarding the parsed data access request to a second computing unit, and acquiring access data from the destination memory unit via the second computing unit and forwarding the access data to the first computing unit.

17. The near-memory computing method according to claim 16, comprising the following steps carried out by the overall routing unit connected to the first computing unit:
   under the condition that the first computing unit cannot access the destination memory unit directly via the overall routing unit connected to the first computing unit and before the overall routing unit connected to the first computing unit forwards the parsed data access request to a second computing unit, judging whether the destination memory unit and the first computing unit are located in the same near-memory computing module;
   under the condition that the destination memory unit and the first computing unit are located in the same near-memory computing module, forwarding the parsed data access request directly to a second computing unit, acquiring access data from the destination memory unit via the second computing unit and forwarding the access data to the first computing unit, wherein the second computing unit can access the destination memory unit directly via the overall routing unit connected to the first computing unit;
   under the condition that the destination memory unit and the first computing unit are not located in the same near-memory computing module, forwarding the parsed data access request to an overall routing unit of at least one further near-memory computing module connected to the overall routing unit connected to the first computing unit and forwarding to a second computing unit connected to the overall routing unit of the at least one further near-memory computing module, and acquiring access data from the destination memory unit via the second computing unit and forwarding the access data to the first computing unit, wherein the second computing unit can access the destination memory unit directly via the overall routing unit of the at least one further near-memory computing module.

18. The near-memory computing method according to claim 11, wherein the computing submodule further comprises at least two routing units, each of which is connected to at least one computing unit, and each of which is connected to at least one memory unit of each memory submodule; wherein the at least two routing units are connected to each other to form an overall routing unit, wherein the overall routing unit is connected to each computing unit, and is connected to each memory unit of each memory submodule, and is connected to at least one further routing unit of at least one further near-memory computing module; wherein the near-memory computing method comprising the following steps carried out by an overall routing unit:
   receiving a data access request, wherein the data access request is issued by a first computing unit and includes at least an address of a destination computing unit; and
   parsing the data access request, acquiring access data from the destination computing unit, and forwarding the access data to the first computing unit; and
   wherein the near-memory computing method further comprises the following steps carried out by the overall routing unit connected to the first computing unit:
   after the overall routing unit parses the data access request and before the overall routing unit acquires access data from the destination computing unit, judging whether the destination computing unit and the first computing unit are located in the same near-memory computing module;
   under the condition that the destination computing unit and the first computing unit are located in the same near-memory computing module, acquiring access data directly from the destination computing unit and forwarding the access data to the first computing unit; and
   under the condition that the destination computing unit and the first computing unit are not located in the same near-memory computing module, forwarding the parsed data access request to an overall routing unit of at least one further near-memory computing module connected to the overall routing unit, and acquiring access data from the destination computing unit via the overall routing unit of the at least one further near-memory computing module and forwarding the access data to the first computing unit.

* * * * *